United States Patent
Brigham

[15] 3,703,131
[45] Nov. 21, 1972

[54] CAMERA FLASH SWITCH ADAPTER
[72] Inventor: Owsley H. Brigham, 7510 Morningside Drive, Indianapolis, Ind. 46240
[22] Filed: April 23, 1971
[21] Appl. No.: 136,966

[52] U.S. Cl. .....................95/11 L, 95/11 W, 240/1.3
[51] Int. Cl..G03b 15/02, G03b 15/04, G03b 15/035
[58] Field of Search .....95/11 R, 11 L, 11 W, 11.5 R; 240/1.3; 431/92, 93

[56] References Cited

UNITED STATES PATENTS

| | | | |
|---|---|---|---|
| 3,550,514 | 12/1970 | Harvey | 95/11 R |
| 3,364,829 | 1/1968 | Ackerman | 95/11.5 R |
| 887,020 | 6/1971 | Michatek et al. | 95/11.5 R |

FOREIGN PATENTS OR APPLICATIONS 1,152,917   5/1969   Great Britain .............95/11 L

*Primary Examiner*—Robert P. Greiner
*Attorney*—Woodard, Weikart, Emhardt & Naughton

[57] ABSTRACT

A switch adapter for operably connecting a camera flash light to a camera having a batteryless flash cube receiver. A housing mountable to the camera receiver has a pair of electrical contacts mounted therein which are closable by the outwardly projecting flash actuator of the camera. A square configured element rotatably mounted to the housing abuts the depressible member of the receiver and is provided with a ridge to lockingly engage the receiver.

13 Claims, 7 Drawing Figures

INVENTOR.
OWSLEY H. BRIGHAM
BY
Woodard, Weikart, Emhardt & Naughton
ATTORNEYS

INVENTOR.
OWSLEY H. BRIGHAM
BY
Woodard, Weikart, Emhardt & Naughton
ATTORNEYS

CAMERA FLASH SWITCH ADAPTER

BACKGROUND OF THE INVENTION

1. Field of the Invention

This invention is in the field of cameras.

2. Description of the Prior Art

The Eastman Kodak Company of Rochester, New York, U. S. A. produces a camera under the registered U. S. trademark of "INSTAMATIC." One embodiment of the camera is shown in the U. S. Pat. No. 3,544,248 issued to Beach. The "INSTAMATIC" X-15 camera has a receiver upon which a magicube flash may be mounted. The magicube flash has an individual light provided in each of the four outwardly facing and vertical surfaces of the cube. Each light is percussion-firable being time-sequenced with the camera shutter. Each light may be utilized only once with each magicube flash providing four separate flashes. A new magicube flash must be mounted subsequent to the four flashes.

Underwater photography requires sufficient lighting for film exposure. In addition, the underwater camera must be mounted within a watertight housing. Previously, when taking underwater photographs with an "INSTAMATIC" camera having a magicube receiver, it was necessary to surface in order to open the watertight housing having the camera mounted therein so as to replace the magicube flash after four flashes had occurred. The invention disclosed herein is a switch adapter which may be mounted to the magicube receiver of the "INSTAMATIC" camera with the switch adapter being connected to a source of electrical energy and to a light mounted externally to the housing receiving the camera. Thus, it is no longer necessary to surface to replace the light.

The prior art includes watertight housings for receiving cameras. These housings typically have lights mounted externally being connected to the camera within the housing. All of the prior art devices, however, have been designed to operate with the conventional camera in lieu of the "INSTAMATIC" camera which receives the percussion-firable flash. The switch adapter may also be utilized with cameras other than in an underwater environment.

SUMMARY OF THE INVENTION

This invention is a switch adapter for operably connecting a light to a camera having a batteryless flash cube receiver comprising: means mountable to the receiver of the camera; a pair of electrical contacts secured to said means and closable by the outwardly projecting and movable flash actuator of said camera; and, a protruding element projecting from said means, said element abutting the depressible member of the receiver when said means is mounted to said camera and forcing said actuator outwardly toward said contacts.

It is an object of the present invention to provide improved means for connecting a light to a camera.

It is another object of the present invention to provide a switch adapter for operatively connecting a light to a camera having a batteryless flash cube receiver.

It is a further object of the present invention to provide a device for operatively connecting the magicube receiver of a camera mounted within a watertight housing to a flash light mounted externally to the housing.

Related objects and advantages will be apparent from the following description.

DESCRIPTION OF THE PREFERRED EMBODIMENT

Figure 1:
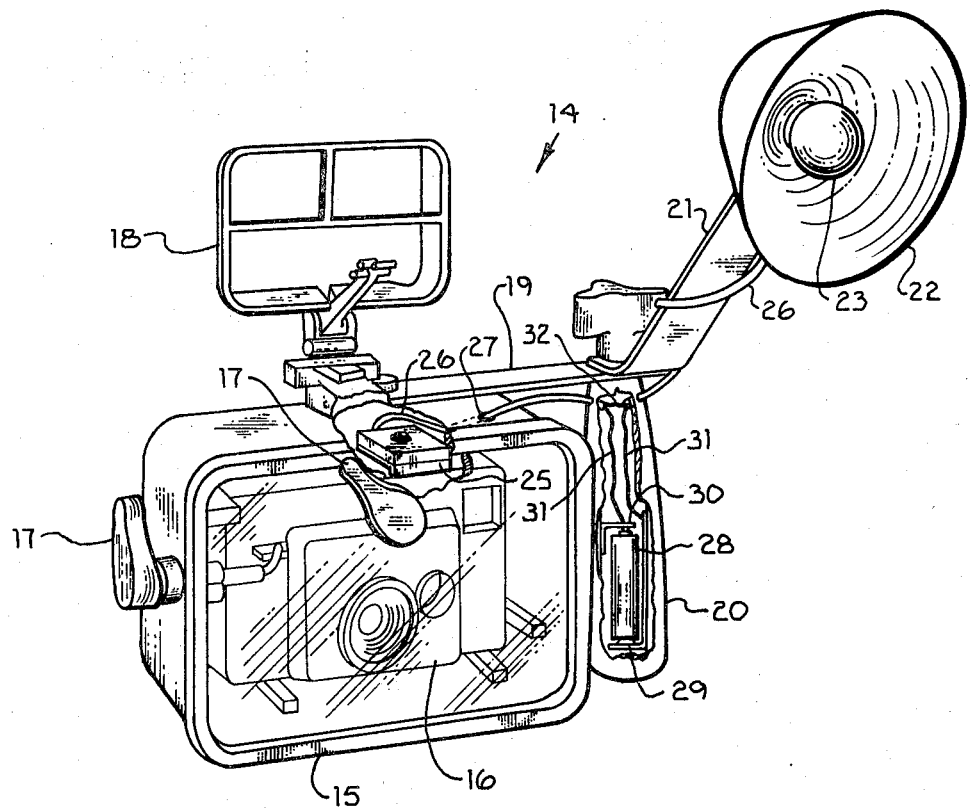
FIG. 1 is a fragmentary perspective view of an underwater photographic apparatus incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a perspective view of an underwater photographic apparatus 14 having a watertight housing 15 with a camera 16 securely mounted therein. The front wall of housing 15 is clear so as to allow an unobstructed view from the shutter aperture of the camera. Various levers 17 are provided for operating the camera. For example, one lever is provided to actuate the shutter control whereas another lever is provided for winding the film in the camera. A viewfinder 18 is mounted to the top of housing 15 so as to allow for aiming of the camera. Bracket 19 is fixedly secured to housing 15 having a handle 20 depending therefrom to facilitate the holding of the underwater photographic apparatus. An upwardly extending arm 21 is secured to the distal end of bracket 19 and has a flash light 23 with shield 22 secured to its top end. A variety of bulbs may be utilized for light 23. For example, a bulb which may be utilized a number of times is most desirable since the bulb will not have to be replaced. Underwater camera housings with lights and light shields are commercially available. For example, such a housing and light shield is available from IKELITE Underwater Systems of 3303 North Illinois Street, Indianapolis, Ind. 46208.

A switch adapter 25 is shown mounted to camera 16 having a pair of insulated wires within cable 26 extending through a watertight, sealed opening 27 in housing 15. The wires 26 are then connected to a source of electrical energy and to bulb 23. The source of electrical energy may be a single or plurality of batteries which may be mounted to housing 15 in a number of ways. For example, handle 20 may be hollow so as to receive a cylindrical sized battery. Handle 20 is fragmented to show battery 28 removably mounted therein having a pair of ends 29 and 30 in contact with wire 31 of cable 26. The second wire 32 is not broken and extends with wire 31 to light 23. Handle 20 may be designed as a typical portable flashlight having a removable end for removal of old batteries and insertion of new batteries. It is to be understood that the previous description concerning the battery mounted within handle 20 is only an example and does not limit in any way the invention disclosed herein.

Figure 2:
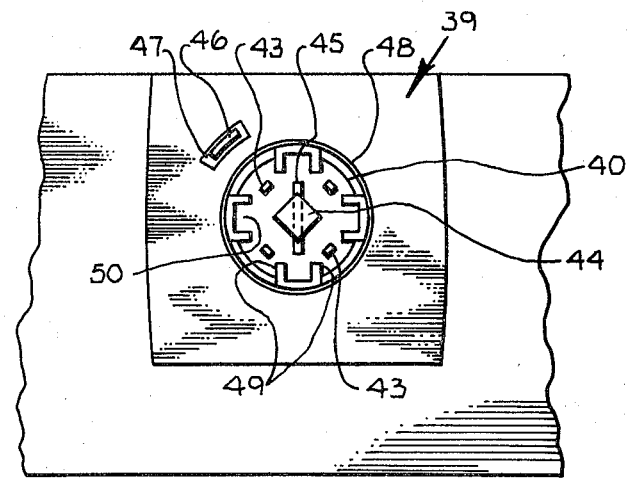
FIG. 2 is a fragmentary top view of a camera having a magicube receiver.

As described in the Description of the Prior Art, the switch adapter 25 is particularly designed for use with the "INSTAMATIC" camera produced by the Eastman Kodak Company. The "INSTAMATIC" camera has a magicube socket which provides rigid support for an inserted percussion firable multilamp photoflash unit. FIG. 2 is a fragmentary top view of camera 16 with switch adapter 25 being removed therefrom to more clearly illustrate the batteryless flash cube receiver or magicube receiver 39. Receiver 39 is provided with a cylindrical socket 48 having a magicube carrier 40 rotatably mounted therein. Centrally positioned with and integrally attached to the carrier is a central stabilizing stud 44 which has a square cross-section. Positioned radially outward from stud 44 and integral with carrier 40 are four flexible retaining fingers 43 for lockingly engaging the magicube mounted to carrier 40. Four pairs of ridges 49 integrally connected to carrier 40 are positioned around stud 44 so as to define open ended slots 50. Positioned immediately adjacent socket 48 is a slot 47 having an actuator 46 slidable therein. A depressible member 45 extending through stud 44 when depressed will force actuator 46 outwardly from the camera. It should be noted that the corners of stud 44 are aligned with each of the four grooves 50 whereas the retaining fingers 43 are aligned with each of the four sides of stud 44.

Figure 3:
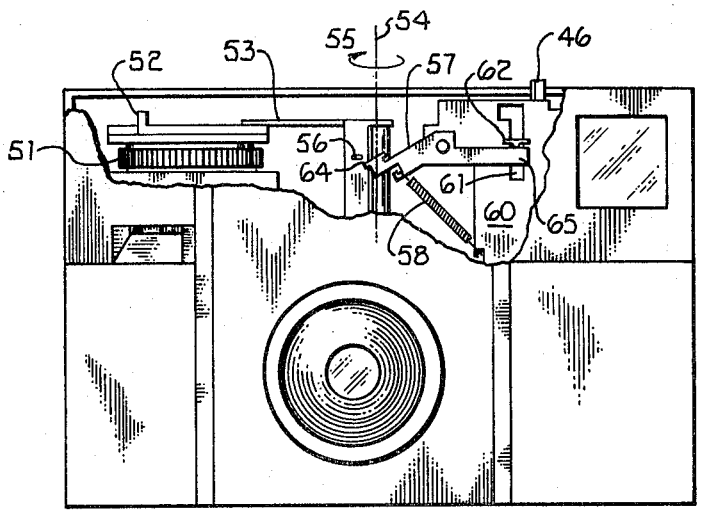
FIG. 3 is a front view of a camera having a magicube receiver with portions of the front wall of the camera being removed to show the inner mechanism.

FIG. 3 is a front view of the camera of FIG. 1 with a portion of the front wall removed and the adapter removed to show the inner mechanism for applying the percussion force through actuator 46. A film advance ratchet wheel 51 may be rotated by a lever extending out the back wall of the camera. As the film advance ratchet gear 51 is rotated, an upwardly extending protrusion 52 will impact arm 53 causing the arm to rotate about axis 54 in the direction of arrow 55, thereby positioning an outwardly extending rod 56 to the left of end 64 of member 57. Member 57 is pivotally mounted to plate 60 and is spring biased in a counterclockwise direction by spring 58. Actuator 46 has a protruding portion 62 extending through and sliding within slot 61 of plate 60. End 65 of member 57 is normally biased against protrusion 62. Rod 56 is shown in the cocked position and will rotate about axis 54 in a direction opposite arrow 55 and move quickly toward end 64 of member 57 when the shutter is released. Upon release of the shutter, rod 56 will therefore impact end 64 causing member 57 to pivot in a counterclockwise direction as viewed in FIG. 3 forcing end 65 against protrusion 62 thereby imparting the percussion force in an upward direction through actuator 46.

Figure 4:
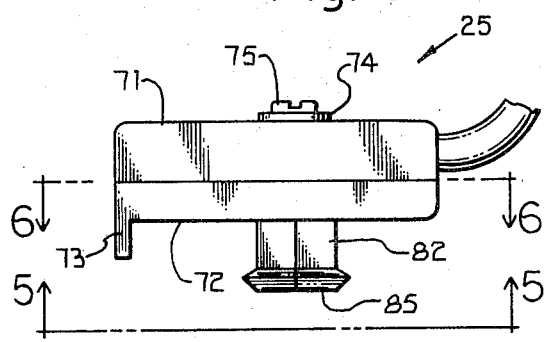
FIG. 4 is an enlarged side view of the switch adapter shown mounted to the camera of FIG. 1.
Figure 5:
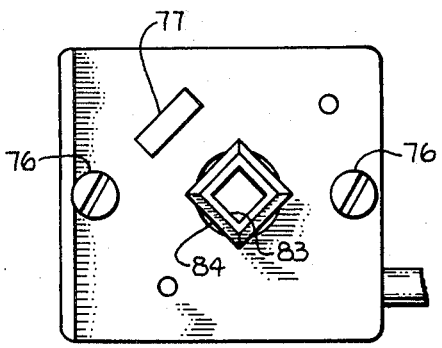
FIG. 5 is a bottom view of the switch adapter of FIG. 4 viewed in the direction of arrows 5—5.
Figure 6:
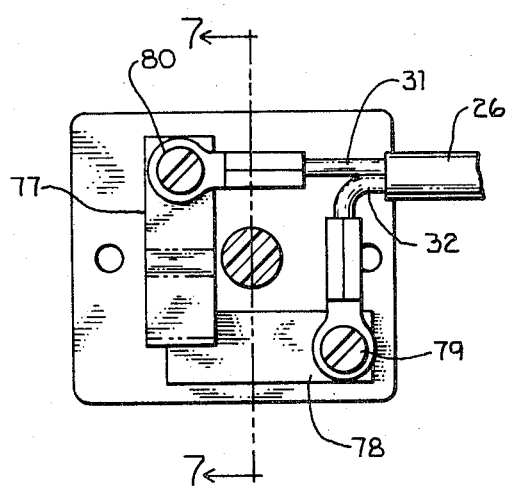
FIG. 6 is a cross-sectional view taken along the line 6—6 of FIG. 4 and viewed in the direction of the arrows.
Figure 7:
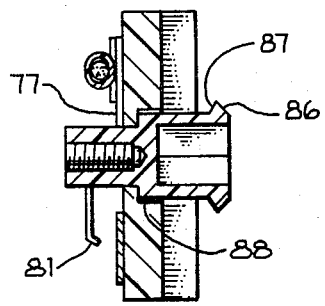
FIG. 7 is a cross-sectional view taken along the line 7—7 of FIG. 6 and viewed in the direction of the arrows.

Referring now to FIG. 4, there is shown the switch adapter 25 which is mountable to camera 16. FIG. 5 is a bottom view of the adapter of FIG. 4 whereas FIGS. 6 and 7 are cross-sectional views respectively looking in the direction of arrows 6—6 and 7—7 of FIGS. 4 and 6. The switch adapter 25 has a housing composed of a top half 71 and a bottom half 72 secured together by a pair of fastening devices 76. Devices 76 may be screws which are threadedly received into half 71 with the heads of the screws positioned in counterbores in half 72. Bottom half 72 has a flange 73 projecting downwardly so as to contact the front face of the camera preventing relative motion between the camera and the housing when the housing is mounted thereon and carrier 40 is rotated. The housing has a pair of contacts 77 and 78 positioned adjacent slot 77 extending through bottom half 72. Electrical contact 78 is made from metal and is secured to the bottom half of the housing by fastening device 79. Contact 78 is flat and abuts the upper surface of half 72. Contact 77 is likewise metal and is secured to the housing by fastening device 80. The upper half 71 of the housing is hollow with the distal end 81 of contact 77 projecting therein. The distal end 81 is normally biased away from contact 78 which is movable toward distal end 81. Actuator 46 projects through slot 77 forcefully touching contact 78. It will be noted that contact 78 is positioned immediately over slot 77. Wires 31 and 32 are respectively connected to contacts 77 and 78 and extend out from the housing being enclosed in insulated cable 26.

Element 82 is rotatably mounted to the housing extending through the lower half and abutting the inside surface of top half 71 and threadedly receiving screw 75. A washer 74 is provided between the head of screw 75 and the top surface of housing half 71. As carrier 40 rotates, element 82 rotates with the carrier along with washer 74 and screw 75. The element 82 is hollow and has a square internal cross section 83 as well as a square external cross section 84. The external and internal cross sections are aligned together and are concentric. A circumferential ridge 85 is provided at the lower end of element 82 so as to be received by the locking fingers 43 of the magicube receiver when the switch adapter is mounted to the camera. Ridge 85 is formed by a pair of converging surfaces 86 and 87 which extend circumferentially around the element. Sloping surfaces 86 and 87 enable the ridge defined therebetween to be easily inserted into and out of the locking fingers. The square external cross section of element 81 extends up from ridge 85 to the lower surface of housing half 72 which has a counterbore 88. Element 82 is cylindrical from the counterbore 88 up to screw 75. The hollow square center of element 82 receives the square stabilizing stud 44 whereas the four corners of ridge 85 fit into slots 50.

The pair of electrical contacts housed within halves 71 and 72 are closable by the outwardly projecting removable flash actuator of the camera. The protruding element 82 rotatably mounted to the housing projects downwardly so as to abut the depressible member 45 of the magicube receiver thereby forcing actuator 46 outwardly toward contact 78. Whenever the housing is mounted to the camera, actuator 46 will touch contact 78 which is positioned over the slot. The contact in abutment with actuator 46 will be forced toward the second contact thereby electrically connecting the lamp to the source of electrical energy whenever actuator 46 is forcefully triggered by the camera shutter control.

While the invention has been illustrated and described in detail in the drawings and forgoing description, the same is to be considered as illustrative and not restrictive in character, it being understood that only the preferred embodiment has been shown and described and that all changes and modifications that come within the spirit of the invention are desired to be protected. For example, switch adapter 25 may be utilized with cameras other than in an underwater environment.

The invention claimed is:

1. A switch adapter for operably connecting a light to a camera having a batteryless flash cube receiver, said camera having a movable flash actuator adjacent said receiver and positionable outwardly from said camera, said receiver having a depressible means for forcing an actuator outwardly of the camera, said adapter comprising:
   a structure mountable externally to said receiver of said camera;
   a first and second electrical contact, said first contact being mounted to said structure and positioned adjacent said actuator but external of said camera, said second contact being mounted to said structure and positioned adjacent said first contact but external of said camera, said first and second electrical contacts closeable to connect said light to a source of electrical energy to energize said light; and,
   a protruding element mounted to said structure and projecting against said depressible means.

2. The adapter of claim 1 wherein:
   said structure is a housing with said first and second contact positioned completely therein, said housing having an opening sized to receive said actuator.

3. The adapter of claim 1 wherein:
   said element is rotatably mounted to said structure; and,
   said receiver is a magicube receiver.

4. The adapter of claim 3 wherein:
   said element is hollow and has a square external cross section and a square internal cross section, said external cross section and said internal cross section are aligned together and are concentric.

5. The adapter of claim 4 wherein:
   said element has a circumferential ridge received by the locking fingers of the receiver when said structure is mounted to said camera.

6. The adapter of claim 5 wherein:
   said structure is a housing and has said first and second contact mounted therein and said element rotatably projecting therefrom.

7. The adapter of claim 6 wherein:
   said housing has a flange projecting downwardly contacting the front face of said camera preventing relative motion between said camera and housing when mounted thereon.

8. The adapter of claim 7 wherein:
   said housing has a slot receiving said actuator with said first contact positioned over said slot and touching said actuator when said housing is mounted to said camera, said first contact positioned over said slot is spaced from said second contact but is movable toward said second contact making electrical contact when said actuator is forcefully triggered by said camera.

9. The adapter of claim 1 wherein:
   said camera is in combination with an under water camera housing and is mountable therein.

10. The adapter of claim 9 wherein:
    said underwater camera housing has a light bulb mounted thereon connected to said first and second contact and a battery connected between said bulb and said first and second contact.

11. In a camera arrangement including a camera having a batteryless flash cube receiver, a flash actuator movably mounted on said camera, said receiver having a depressible member mounted thereon and arranged to force said actuator outwardly of said camera when said depressible member is depressed, the improvement which comprises:
    a switch adapter mountable to the receiver of the camera;
    a pair of electrical contacts secured to said switch adapter and closable by the outwardly projecting and movable flash actuator to connect a light to a source of electrical energy to energize said light; and,
    a protruding element projecting from said switch adapter and abutting the depressible member and forcing said actuator outwardly toward said contacts.

12. The arrangement of claim 11 wherein:
    said protruding element is rotatably mounted to said adapter and is hollow with a square external cross section and a square internal cross section concentric with said external cross section.

13. The arrangement of claim 12 wherein:
    said element has a circumferential ridge lockingly received by said receiver.

* * * * *